United States Patent [19]

Kuster et al.

[11] Patent Number: 4,676,705
[45] Date of Patent: Jun. 30, 1987

[54] PALLET CLAMP ASSEMBLY

[75] Inventors: Donald F. Kuster, Downers Grove; Edward Herbst, Posen, both of Ill.

[73] Assignee: Continental Can Company, Inc., Stamford, Conn.

[21] Appl. No.: 826,353

[22] Filed: Feb. 5, 1986

[51] Int. Cl.⁴ .................... B60P 1/64; B61D 45/00
[52] U.S. Cl. .................... 410/80; 410/105; 292/DIG. 15
[58] Field of Search .................... 244/118.1; 292/338, 292/DIG. 15; 410/30, 49, 52, 75, 77, 78, 79, 80, 93, 94, 104, 105

[56] References Cited

U.S. PATENT DOCUMENTS

| | | | |
|---|---|---|---|
| 1,949,218 | 2/1934 | Owens | 410/94 |
| 2,887,070 | 5/1959 | Terlecky et al. | 410/94 |
| 3,415,480 | 12/1968 | Sertich | 410/77 |
| 3,493,210 | 2/1970 | Brenner | 410/94 |
| 3,543,969 | 12/1970 | Zambruski | 410/75 |
| 3,800,713 | 4/1974 | Nordstrom | 410/79 |
| 3,868,083 | 2/1975 | Titcombe | 410/80 |
| 4,234,278 | 11/1980 | Harshman et al. | 410/77 |

FOREIGN PATENT DOCUMENTS 589031 12/1959 Canada .................... 410/80

Primary Examiner—Robert B. Reeves
Assistant Examiner—David F. Hubbuch
Attorney, Agent, or Firm—Charles E. Brown

[57] ABSTRACT

This relates to a clamp assembly for engagement with a lowermost rear pallet board in a truck or trailer so as to restrain the pallet and all preceding pallets and those stacked thereon against rearward movement. The pallet clamp assembly includes a suitable track recessed in the trailer bed or floor and a pallet clamp which is adjustable longitudinally of the track and which in its inoperative position is fully seated and retained in the track against movement. The pallet clamp is of a simple construction and once released against movement longitudinally of the track may be easily manually positioned relative to a pallet and then locked relative to the track in its adjusted position. In a like manner, when it is desired to unload the truck or trailer, the pallet clamp may be readily released with respect to the track, moved rearwardly away from the pallet and fully seated within the track so as to in no way interfere with the unloading of pallets from the truck or trailer.

11 Claims, 10 Drawing Figures

U.S. Patent Jun. 30, 1987 Sheet 1 of 3 4,676,705
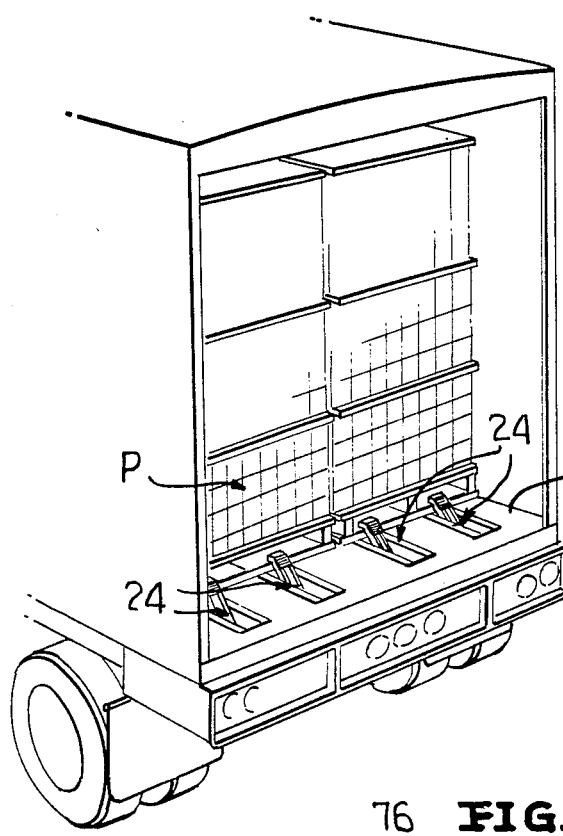
FIG. 1
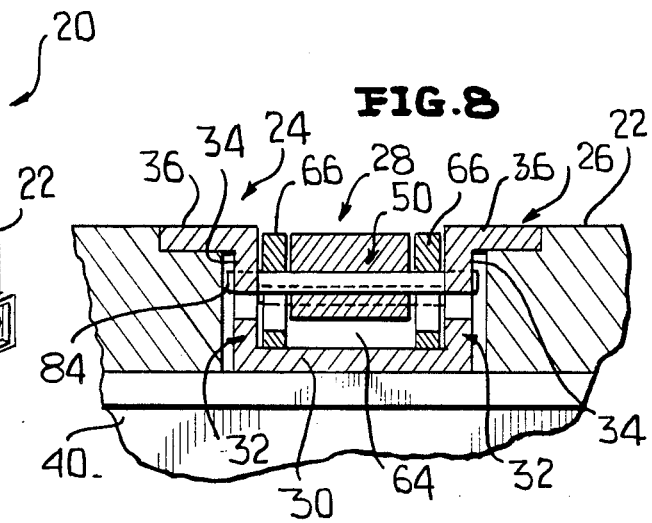
FIG. 8
FIG. 2
FIG. 3
FIG. 4
FIG. 5

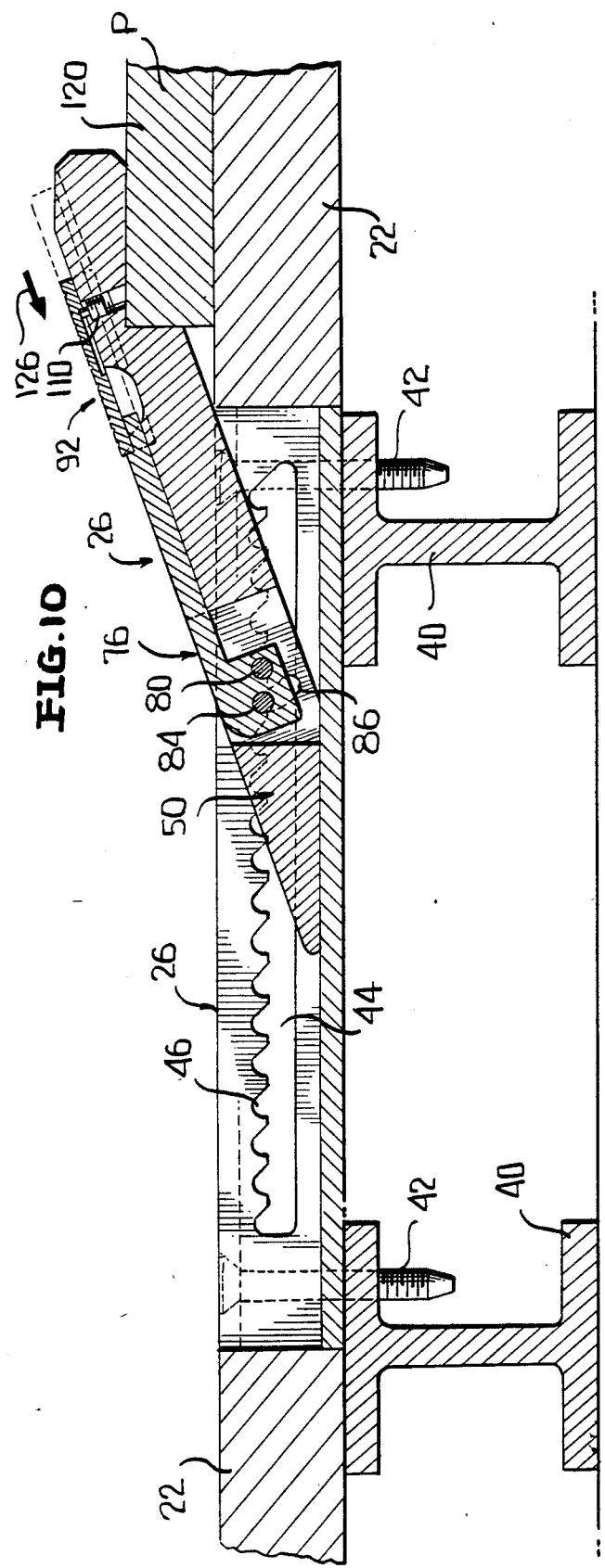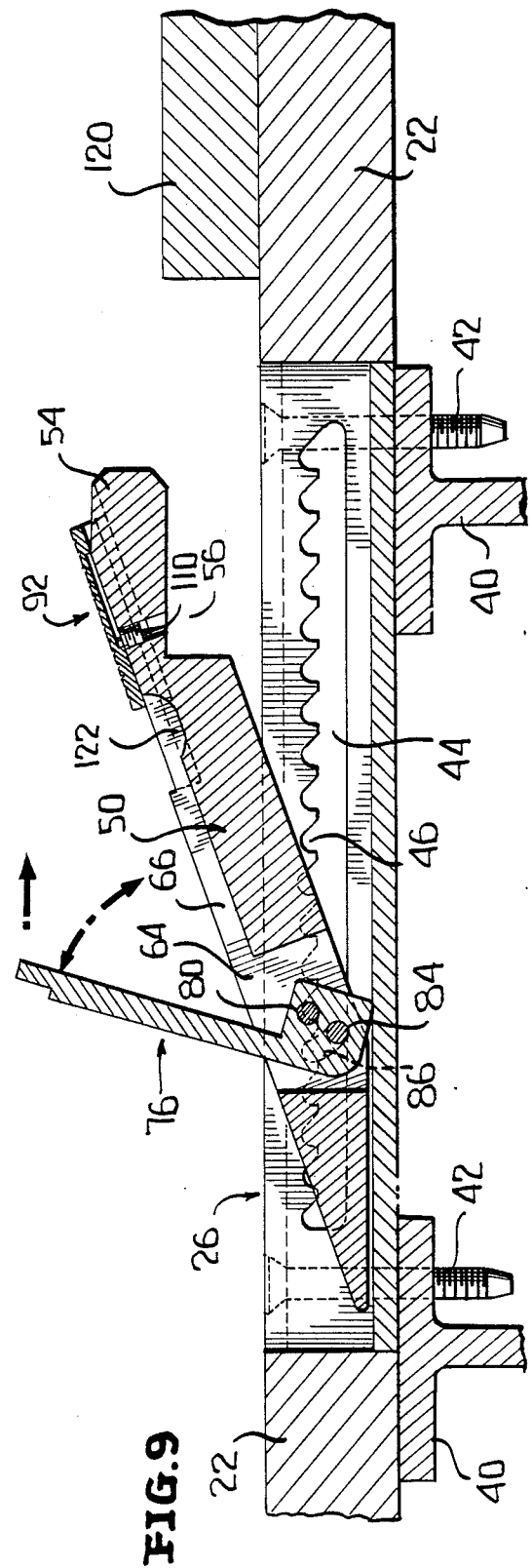

PALLET CLAMP ASSEMBLY

This invention relates in general to new and useful improvements in clamps, and more particularly to a pallet clamp assembly which includes a track and a pallet clamp, the pallet clamp being slidable relative to the track for engaging a pallet and restraining the pallet against movement further towards the pallet clamp.

This invention particularly relates to a pallet clamp assembly for use in truck and trailer type vehicles for clamping pallet stacks against front walls of vehicles against rearward shifting.

Pallet clamps have been previously developed. However, such pallet clamps for the most part are unduly complex, and more particularly are not easily actuated. One of the primary features of the invention is the provision of a pallet clamp which may be easily manually locked and released and which may be clamped relative to the associated track both in an operative and in an inoperative position.

A further feature of the pallet clamp assembly is the construction of the pallet clamp wherein in the inoperative position of the pallet clamp, the pallet clamp is fully recessed within the track and in no way hinders the sliding of pallets on a truck bed or the operation of lift trucks on the truck bed for positioning pallets in the forward portion of the truck bed.

With the above and other objects in view that will hereinafter appear, the nature of the invention will be more clearly understood by reference to the following detailed description, the appended claims and the several views illustrated in the accompanying drawings.

FIG. 1 is a fragmentary perspective view of the rear of a truck or trailer equipped with pallet clamp assemblies in accordance with this invention and shows the pallet clamp assemblies in operative pallet retaining positions.

FIG. 2 is an exploded side elevational view of a section of the track and the principal components of the pallet clamp.

FIG. 3 is an enlarged vertical sectional view taken through a clamp member and shows the means for mounting and retaining lock means in an adjusted position on the clamp member.

FIG. 4 is a bottom plan view of the lock means and shows further the details thereof.

FIG. 5 is an enlarged fragmentary transverse vertical sectional view taken generally along the line 5—5 of FIG. 2 and shows more specifically the details of the lock means.

FIG. 8 is a fragmentary transverse sectional view taken generally along the line 8—8 of FIG. 7 and shows the details of locking the pallet clamp in an adjusted position with respect to the track.

FIG. 9 is a longitudinal vertical sectional view similar to FIG. 7 and shows the pallet clamp being moved from its inoperative position towards a pallet for the purpose of retaining the pallet against rearward movement to the left.

FIG. 10 is another longitudinal sectional view simialr to FIG. 7 and shows the pallet clamp in its pallet clamping position and locked against accidental release.

Figure 7:
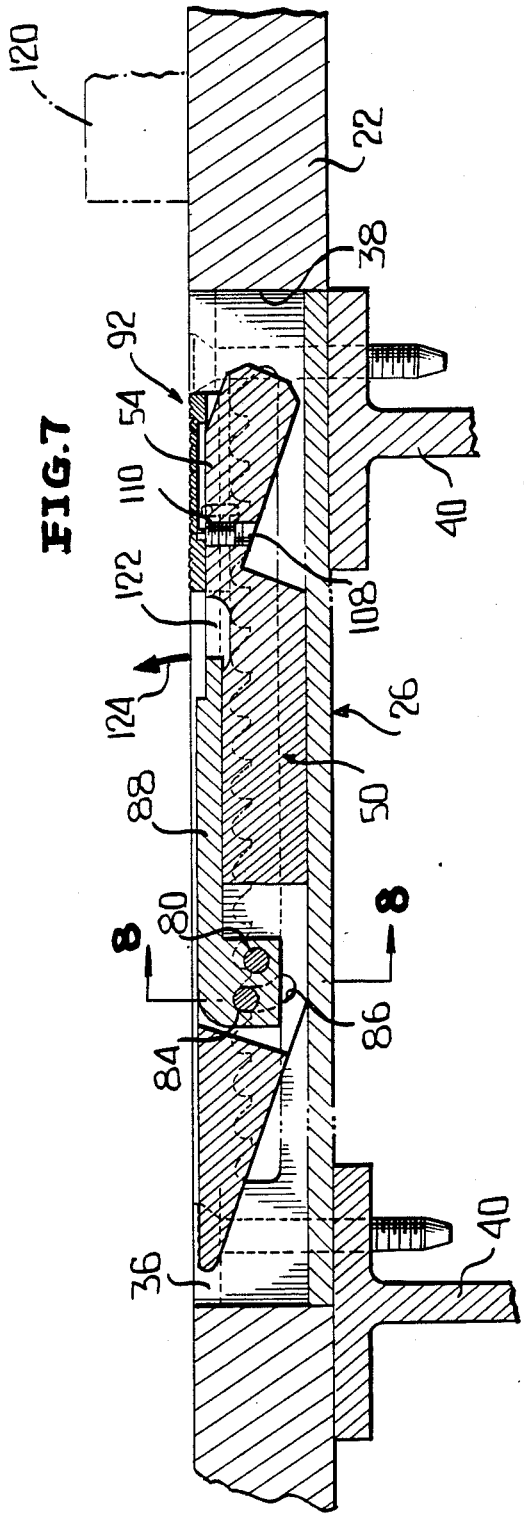
FIG. 7 is a longitudinal vertical sectional view taken generally along the line 7—7 of FIG. 6 and shows more specifically the details of the pallet clamp and the mounting thereof in an inoperative retracted position within the track.

Referring now to the drawings in detail, it will be seen that there is illustrated a rear portion of a truck or trailer, generally identified by the numeral 20. The truck or trailer 20 has a bed or floor 22 on which loaded pallets P are positioned in stacked relation. This invention particularly relates to pallet clamp assemblies generally identified by the numeral 24 which are carried by the bed 22 and which engage the rearmost pallets so as to generally clamp the pallet stacks against the front wall (not shown) of the truck or trailer body 20.

Normally the filled pallets P will be arranged in the truck or trailer body 20 in two rows and in accordance with this invention, there will be two pallet clamp assemblies 24 associated with the rearmost pallet in each of these rows.

Basically, each pallet clamp assembly 24 includes a track, generally identified by the numeral 26, and a pallet clamp, generally identified by the numeral 28, adjustably carried by the track 26.

As is best shown in FIG. 8, the track 26 is of an upwardly opening channel cross section and includes a base 30 and upstanding rails 32. The rails 32 include rail members 34 which are disposed in parallel relation and project normal to the plane of the base 30. Each rail 34, in turn, carries a mounting flange 36 with the mounting flanges 36 extending in opposite directions away from each other.

With reference to FIGS. 7 and 8, it will be seen that the bed or floor 22 is provided with an elongated opening 38 in which the track 26 is mounted. In the illustrated embodiment of the invention, the opening 38 extends entirely through the bed 22 with the track 26 being seated on transverse frame members 40 of the truck or trailer. The flanges 36 will be seated in recesses in the upper surface of the bed 22 and will be secured to the bed 22 by means of suitable screw type fasteners 42 which will extend through the flanges 36 into the bed 22. Endmost ones of the fasteners 42 may also pass through the frame rails 40 as is shown in FIG. 7.

At this time it is pointed out that although in accordance with the illustrated embodiment of the invention, the tracks are seated within the bed 22, it is to be understood that the tracks may be equally as well seated within walls of a container.

Referring now to FIG. 2 in particular, it will be seen that the rail members 34 are each provided with a longitudinally elongated slot 44 spaced from the base 30. Further, each of the rail members 34 is provided with a plurality of longitudinally adjacent, but spaced, notches 46 which open into the slot 40 towards the base 30. Each notch 46 has a part circular seating portion 48 disposed remote from the base 30.

The pallet clamp 28 is formed of many parts. The basic part is a clamp member, generally identified by the numeral 50. The clamp member 50 is of a solid construction and is generally rectangular in cross section. The clamp member 50 includes a rear end portion 52 and a forward end portion 54. The forward end portion 54 has a notch 56 formed in the underside thereof. The notch 56 extends transversely of the clamp member 50 and includes an upwardly and rearwardly sloping upper wall 58 and a downwardly and rearwardly sloping rear wall 60, the rear wall 60 being generally at right angles to the upper wall 58.

It is to be understood that the notch 56 will form a seat for a pallet board in the manner which will be described in detail hereinafter.

In order to permit the clamp member 50 to assume a tilted position relative to the track 26, the underside of the front end portion 52 of the clamp member 50 is recessed so as to define an upwardly and rearwardly sloping undersurface 62. Preferably, for reasons which will be apparent hereinafter, the surface 62 will be parallel to the surface 58.

Immediately adjacent the rear end portion 52, there is an opening 64 through the thickness of the clamp member 50. The opening 64 is bounded on opposite sides thereof by side wall portions 66.

Intermediate poriton of the clamp member 50 forwardly of the opening 64 has the top portion thereof relieved as a forward continuation of the opening 64 to define a seat 67, the function of which will be described in detail hereinafter.

The upper surface of the forward end portion 54 is reduced in height as at 68 and has side edge portions removed as at 70 so that the upper part of the front end portion 54 is of a generally T-shaped cross section including a reduced width stem 72 and an upper cross bar 74.

Figure 6:
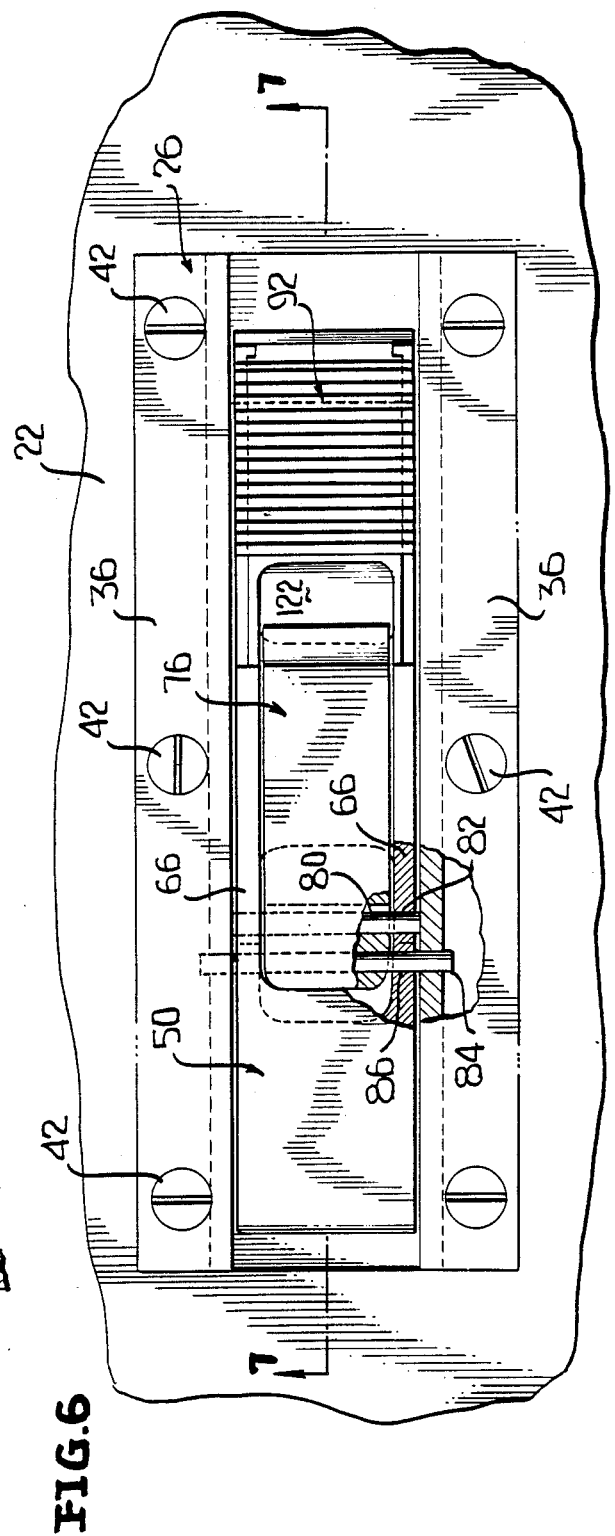
FIG. 6 is an enlarged plan view with parts broken away and shown in section showing the general details of the pallet clamp assembly and the mounting thereof in a truck bed or floor.

The pallet clamp 28 includes a lever generally identified by the numeral 76. The lever 76 includes a lever head 78 which is received in the opening 64. The lever head 78 is pivotally mounted relative to the clamp member 50 by means of a pivot pin 80 (FIG. 6) which has end portions seated in bores 82 in the side wall portions 66.

The lever head 78 also carries a latch pin 84 which extends entirely through the lever head 78 and through arcuate slots 86 centered on the axis of the bores 82. The latch pin 84 extends beyond the clamp member 50 and into the rails 32 for selective engagement in the notches 46 in seated engagement to the part circular upper portions 48 thereof.

The lever 76 also includes a lever handle 88 which is formed rigid with the lever head 78. The lever handle 88 has a free forward end with the forward end portion of the lever handle 88 being notched as at 90 in the upper surface thereof.

The forward end poriton 54 of the clamp member 50 carries lock means in the form of a channel-shaped member, generally identified by the numeral 92. The channel member 92, which is a slide member, has a cross section best shown in FIG. 5 including an upper web 94, depending flanges 96, and opposed inturned flanges 98. It is to be understood that the cross section of the channel or slide member 92 is one for fitting the T-shaped projection 68 of the forward end portion of the clamp member 50.

First of all, as is shown in FIGS. 2 and 5, the upper surface of the web 94 is provided with a plurality of transverse grooves 100 to facilitate the gripping of the lock member 92. Next, as is bet shown in FIG. 4, the underside of the web 94 is provided with a centrally located, longitudinal groove or slot 102. Also, as shown in FIG. 4, the underside of the web 94 is provided with a forwrd set 104 and a rear set 106 of part spherical recesses.

As is best shown in FIGS. 2 and 7, the forward end portion 54 of the clamp member 50 is provided with a threaded bore 108 in which there is threadly seated a retaining member 110 having a projecting end pin 112. The pin 112 is received in the slot 102 to limit movement of the channel or slide member 92 in a longitudinal direction.

Further, as is best shown in FIG. 3, the forward end portion 54 of the clamp member 50 is provided with a pair of transversely spaced ball detents including ball members 114 which are urged outwardly by coil springs 116. It is to be understood that each set of a ball member 114 and a spring 116 is seated in a bore 118 in the upper surface of the clamp member 50 and after the ball member 114 and the spring 116 have been positioned in the bore 118, the outer end of the bore 118 is lightly swaged inwardy to lock the ball member within the bore 118. The ball members 114, however, project sufficiently above the upper surfaces of the clamp member 50 for engagement in the seats 104 and 106 depending upon the position of the channel member 92.

It is understood that the pallet clamp 28 must be seated within the track 26 prior to the mounting of the track 26 in the truck bed or wall. Once the pallet clamp 28 is seated in the track 26, it is retained therein against removal by the latch pin 84.

With reference to FIG. 7, it will be seen that the pallet clamp 28, in its inoperative position, is fully seated in the track 26 and does not project thereout. The pallet clamp 28 is further locked against longitudinal movement within the track 26 by engagement of the latch pin 84 in a respective one of the notches 46.

After the truck or trailer ahs been loaded, a rearmost bottom board 120 of a pallet will be positioned for engagement by the pallet clamp 28. At this time, with the channel member 92 in a forward position, and the forwrd end of the lever handle 88 being uncovered, one, by way of a finger receiving recess 122, may engage the free end of the lever handle 88 to pivot the same upwardly and rearwardly as indicated by the arrow 124 to release the latch pin 84 from the track 26.

After the latch pin 84 has been released fron the track 26, the forward end portion 54 of the clamp member 50 may be lifted out of the track 26 as is shown in FIG. 9. The pallet clamp 28 may then be slid forwrdly from the position of FIG. 9 to the position of FIG. 10 where it is engaged over the board 120. The lever 76 is then pivoted in the opposite direction to engage the latch pin 84 with an appropriate one of the notches 46 with the result that the rear end portion 52 of the clamp member 50 will be forced down against the base 30 of the track 26 with the surface 62 engaging the upper surface of the base 30 as is clearly shown in FIG. 10. After the lever handle 88 is seated back in the seat 67, the channel or slide member 92 is then slid rearwardly as indicated by the arrow 126 in FIG. 10. At this time the pallet clamp 28 is locked relative to the track 26 and at the same time is so engaged with the board 120 of a pallet P so as to restrain rearward movement of the pallet P during transport.

Inasmuch as it is merely necessary to seat the forward end portion 54 of the clamp member 50 on the pallet board 120 and then utilize the lever 76 to lock the clamp member 50 to the track, it will be seen that the locking action is a very simple one requiring no particular effort on the part of the person loading the truck or trailer or like carrier.

Although only a preferred embodiment of pallet clamp has been specifically illustrated and described herein, it is to be understood that minor variations may be made in the pallet clamp assembly without departing from the spirit and scope of the invention as defined by the appended claims.

We claim:

1. A pallet clamp for use with a channel-shaped track including a base and two upstanding rails each having a plurality of adjacent downwardly opening notches opening into an elongated slot, said pallet clamp comprising an elongated clamp member having forward and rear end portions, said forward portion having a pallet engaging undersurface, said clamp member having an opening therethrough adjacent said rear end portion, a pivot pin extending transversely of said clamp member through said opening, a lever having a locking head positioned within said opening and pivotally mounted on said pivot pin, a latch pin carried by said lever head and extending transversely of and beyond said latch member for selective engagement in rail notches to position said clamp member longitudinally of the track, said lever including a handle rigid with said lever head for pivoting said lever to position said lever head, and lock mans for releasably locking said lever in a rail engaging position.

2. A pallet clamp according to claim 1 wherein said lever handle extends forwardly from said lever head, and said lock means is longitudinally slidably carried by said forward portion for selective engagement with said lever handle.

3. A pallet clamp according to claim 2 wherein an intermediate part of said clamp member has an upper surface having recessed therein a seat for said lever handle.

4. A pallet clamp according to claim 3 wherein said lock means is in the form of a channel cross sectional member having an upper web for overlying said lever handle and side flanges for guidedly engaging an upper part of said forward portion.

5. A pallet clamp according to claim 4 wherein there are detent means for locking said lock means in a selected position.

6. A pallet clamp according to claim 1 wherein said rear portion has an upwardly and rearwardly sloping undersurface disposed at an angle wherein said clamp member may be tilted from a retracted position to an upwardly and forwardly sloping pallet engaging position.

7. A pallet clamp according to claim 1 wherein said clamp member has side wall portions forming sides of said opening, and said side wall portions having therethrugh transversely aligned arcuate slots centered on said pivot pin, and said latch pin passing through said arcuate slots.

8. A pallet clamp assembly comprising an elongated track and a pallet clamp, said track being channel-shaped and including a base and projecting parallel spaced apart rails, each of said rails having formed therein an elongated longitudinal slot and a plurality of longitudinally spaced notches opening into a respective slot towards said base, said pallet clamp comprising an elongated clamp member having forward and rear end portions, said forward portion having a pallet engaging undersurface, said clamp member having an opening therethrough adjacent said rear end portion, a lever having a locking head positioned within said opening and pivotally mounted on a pivot pin extending transversely of said clamp member through said opening, a latch pin carried by said lever head and extending transversely of and beyond said latch member for selective engagement in said track notches to position said clamp member longitudinally of said track, said lever including a handle rigid with said lever head for pivoting said lever to position said lever head, and lock means for releasbly locking said lever in a track engaging position.

9. A pallet clamp assembly according to claim 8 wherein said rails have measn for mounting said track.

10. A pallet clamp assembly according to claim 8 wherein said rails have means for mounting said track in a recess in a wall.

11. A pallet clamp assembly according to claim 8 wherein said rails and said clamp member are of a dimension normal to said base for the full seating of said pallet clamp within said track in an inoperative position of said pallet clamp.

* * * * *